(12) United States Patent
Damidaux et al.

(10) Patent No.: US 8,305,266 B2
(45) Date of Patent: Nov. 6, 2012

(54) NETWORK AND METHOD FOR CALCULATING IONOSPHERE CORRECTIONS

(75) Inventors: Jean-Louis Damidaux, Auzielle (FR);
 Jean-Christophe Levy, Balma (FR)

(73) Assignee: Thales, Neuilly sur Seine (FR)

( * ) Notice: Subject to any disclaimer, the term of this patent is extended or adjusted under 35 U.S.C. 154(b) by 207 days.

(21) Appl. No.: 12/933,310

(22) PCT Filed: Mar. 16, 2009

(86) PCT No.: PCT/EP2009/053095
 § 371 (c)(1),
 (2), (4) Date: Nov. 9, 2010

(87) PCT Pub. No.: WO2009/115498
 PCT Pub. Date: Sep. 24, 2009

(65) Prior Publication Data
 US 2011/0050494 A1  Mar. 3, 2011

(30) Foreign Application Priority Data
 Mar. 21, 2008 (FR) ..................................... 08 01573

(51) Int. Cl.
 *G01S 19/07* (2010.01)
(52) U.S. Cl. .................................................. 342/357.44
(58) Field of Classification Search .............. 342/357.44
 See application file for complete search history.

(56) References Cited

U.S. PATENT DOCUMENTS 5,944,770 A * 8/1999 Enge et al. .................... 701/470

6,356,232 B1 * 3/2002 Rocken et al. ............. 342/357.45
2003/0067409 A1 4/2003 Murphy

OTHER PUBLICATIONS

Ming Luo, et al., "LAAS Ionosphere Spatial Gradient Threat Model and Impact of LGF and Airborne Monitoring", ION GPS/GNSS, Jan. 1, 2003, pp. 2255-2274, XP 007905931.
Shau-Shiun Jan et al., "Analysis of a Three-Frequency GPS/WAAS Receiver to Land an Airplane", Proceedings of the 15 International Technical Meeting of the Satellite Division of the Institute of Navigation ION GPS, Sep. 24-27, 2002, pp. 2576-2586, URL:http://www.ion.org/search/purchase_paper.cfm?jp=p&id=2282, XP007905941.
A Batchelor et al., "Ionospheric Delay Estimation in the European Global Navigation Overlay Service", Nov. 19, 1966, pp. 3/1-3/6, XP006510271.

* cited by examiner

*Primary Examiner* — Harry Liu
(74) *Attorney, Agent, or Firm* — Baker & Hostetler LLP

(57) ABSTRACT

The invention relates to a network making it possible to calculate and provide ionospheric corrections to the users of a satellite navigation system, wherein the network also comprises: an aeronautical segment comprising an aeronautical user segment composed of a plurality of aircraft each one having an on-board RF receiver capable of measuring delays of the navigation signals transmitted by the satellites and an aeronautical data communication means between the plurality of aircraft and the ground segment in order to transmit said measurements of delays to the ground segment, and means, at the level of the ground segment, of receiving measurements of delays used for the calculation of the grid, the measurements of delays coming from the plurality of aircraft and from the plurality of ground stations.

8 Claims, 2 Drawing Sheets

NETWORK AND METHOD FOR CALCULATING IONOSPHERE CORRECTIONS

CROSS-REFERENCE TO RELATED APPLICATIONS

This application is a National Stage of International patent application PCT/EP2009/053095, filed on Mar. 16, 2009, which claims priority to foreign French patent application No. FR 08 01573, filed on Mar. 21, 2008, the disclosures of which are incorporated by reference in their entirety.

FIELD OF THE INVENTION

The field of the invention relates to satellite navigation systems and more particularly to a network and a method for calculating ionospheric corrections.

BACKGROUND

"Satellite navigation system" here refers to any system dedicated to wide area navigation, such as for example the existing GNSS (Global Navigation Satellite System) systems, called GPS, GLONASS, or the future GALILEO system, as well as all their equivalents and derivatives. Those skilled in the art know well the principle of location used by satellite navigation systems. The radio signal transmitted by a satellite is encoded and the time taken by this signal to reach the receiver to be located is used for determining the distance between that satellite and that receiver, preferably called the pseudo-distance. The accuracy of satellite navigation systems is affected by a certain number of errors. These errors can be divided into two categories: global contributions and local contributions. For global contributions, it is possible to mention the errors related to the passage of electromagnetic waver in the ionosphere and the errors related to the satellites (orbit and clock errors). For local contributions, it is possible to mention the errors related to the passage of electromagnetic waves in the troposphere, signal reflection errors, the errors related to interference, the errors due to white zones and the noise of the receivers. In order to improve the existing satellite systems in terms of accuracy, integrity, continuity and availability, systems have been provided, known in the spatial field as "augmentation systems". The European satellite augmentation system EGNOS improves the performance of the two satellite systems GPS and GLONASS. It transmits pseudo-distance corrections in order to correct the abovementioned errors.

The invention is intended to correct ionospheric errors more particularly. It is recalled that the density of the air which constitutes the atmosphere decreases as the distance from the surface of the Earth increases. At ionospheric altitude, the cosmic and solar rays are no longer filtered. These rays (ultraviolet and X) are more aggressive and tear electrons from the atoms constituting the air, which is called ionization. The refraction index is therefore altered and therefore has the variation of the speed of propagation of the signals passing through the ionospheric layer as a consequence. Given that the delay is calculated by assuming a speed of propagation of the navigation signals equal to the speed of light, the passage through the ionospheric layer gives rise to an erroneous pseudo-distance measurement due to a delay in the measurement of the navigation codes or to an acceleration in the phase measurements. In order to obtain better accuracy in the calculation of positions, it is necessary to estimate the ionospheric error which can moreover vary throughout the day.

FIG. 1 describes a satellite navigation system architecture, known to those skilled in the art, comprising a GNSS positioning system and an SBAS (Satellite Based Augmentation System) augmentation system. The aircraft 4 have on-board receivers connected to the EGNOS augmentation systems. EGNOS is a system of the SBAS type comprising, in a ground segment 300, an infrastructure constituted by a plurality of ground stations "SBAS G" and, in a spatial segment 100, a plurality of geostationary satellites "SBAS S". The ground segment comprises a plurality of ground stations spread over a wide geographic area, which receive data from the GNSS satellites and determine the pseudo-distances, and a central control and processing station 1 which, from the pseudo-distances transmitted by the SBAS G receiving stations, determines the corrections which are grouped in a signal 10. The geostationary satellites "SBAS S" relay this signal 10 from the central station 1 to the receivers of the aircraft 4.

The calculating station 1 compiles the ionospheric corrections data in order to calculate a grid 96 of ionospheric corrections 91 to 94 as shown in FIG. 2. When the navigation signals pass through the ionospheric layer the ground stations "SBAS G" determine piercing points corresponding to the satellite to ground stations line of sight. The whole of the territory covered by the ground stations is thus sampled by piercing points to which correspond the ionospheric delay measurements. When a point is adjacent to points of the ionospheric corrections grid, the value of the ionospheric delay 95 is determined by extrapolating the values 91 to 94 of the adjacent piercing points. The coverage and the fineness of the grid 96 of ionospheric corrections are proportional to those of the network of ground stations and satellites.

These conventional systems (GNSS and SBAS) exhibit several problems. A first problem is the coverage of the area. In fact, the coverage of the grid of ionospheric corrections depends on the distribution of the ground stations which can be deployed only over terrestrial areas of easy access. Outside of these limits, such as for example over maritime or mountainous zones, the navigation systems exhibit a performance degradation. A second problem is the number of samples for calculating the corrections grid. The more delay measurements data there are, the more accurate are the corrections. This number of measurements is directly related to the number of satellites and to the number of ground stations whose cost is high (also because of the maintenance and the real time data communication streams). A third problem is the quality of the measurements. The measurements carried out by the ground stations are affected by local error contributions such as reflection problems, interference and the troposphere for example.

In the prior art there is known the U.S. Pat. No. 6,674, 398B2 which describes an invention using mobile receivers for measuring the ionospheric delays. These measurements are then sent directly to the spatial segment which relays these data to a calculating system in the ground segment for compiling them and calculating a grid of ionospheric corrections. However, this invention necessitates creating and having the availability of a dedicated user link to the spatial segment, and leaves the possibility of using by non-aeronautical users and is therefore not worthy of confidence for an aeronautical service.

SUMMARY OF THE INVENTION

More precisely, the invention relates to a network making it possible to calculate and provide ionospheric corrections to the users of a satellite navigation system whose essential feature is to include an aeronautical segment, comprising an aeronautical user segment composed of a plurality of aircraft each one having an on-board RF receiver capable of measuring delays of the navigation signals transmitted by the satellites and an aeronautical data communication means between the plurality of aircraft and the ground segment in order to transmit said measurements of delays to the ground segment, and a ground segment comprising means of receiving measurements of delays used for the calculation of the grid of ionospheric corrections, the measurements of delays coming from the plurality of aircraft and from the plurality of ground stations.

The invention is advantageous in the sense that it produces a network of ionospheric corrections for a satellite navigation system by using the architecture of a satellite communication system and measurement and communication components already existing in the aeronautical field. The invention takes advantage of the reliability and service quality requirements of aeronautical networks. In fact, the satellite transmissions do not exhibit the same level of integrity as the transmissions designed in the aeronautical field. Aeronautical user receivers are themselves also worthy of confidence. The invention makes it possible to have the availability of an architecture of communication of ionospheric corrections exhibiting increased reliability in comparison with prior solutions which are confined to a satellite communication architecture. Moreover, it is not necessary to have the availability of dedicated links to the satellite because communication links from the aircraft to the ground segment which are already designed for taking the number of aircraft into account are used again.

The measurements are also carried out at the level of the aeronautical segment, and therefore not affected by local error contributions. The corrections thus calculated by the calculating system are more accurate.

The invention is intended, as shown in FIG. 2, to provide ionospheric corrections data 91 to 95 that are more accurate and whose geographic coverage 96 is more extensive and has a finer sampling. The number of ionospheric measurements is proportional to the density of the number of aircraft 2 in flight and, consequently, there is available a grid of ionospheric corrections 96 which is denser and therefore more accurate. The invention makes it possible to detect small ionospheric disturbances because the sampling of the grid 96 of ionospheric corrections is finer.

A network for calculating ionospheric corrections according to the invention has a measurement potential that is much greater than the requirements and thus it is possible to reduce the number of "SBAS G" ground stations and therefore to reduce the costs of the satellite augmentation system of the SBAS type. Moreover, the network for calculating ionospheric corrections carries out the measurements from aircraft and is not therefore limited in coverage by maritime or mountainous zones. There will therefore no longer be any degradation of performance at the edges of these zones.

BRIEF DESCRIPTION OF THE DRAWINGS

The invention will be better understood and other advantages will become apparent on reading the following description given in a non-limiting manner and with reference to the appended figures in which:

FIG. 2 illustrates the way of calculating by extrapolation of the corrections for any point in space.

DETAILED DESCRIPTION

Figure 1:
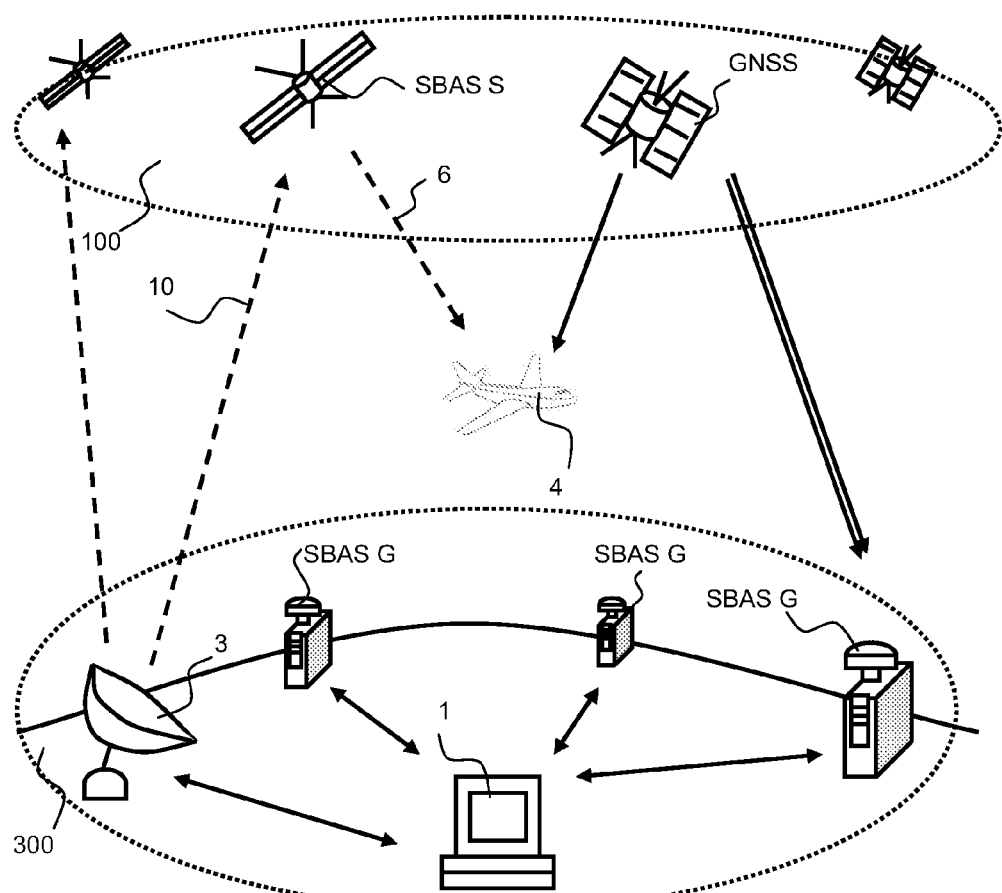
FIG. 1 shows a satellite system architecture according to the prior art.
Figure 2:
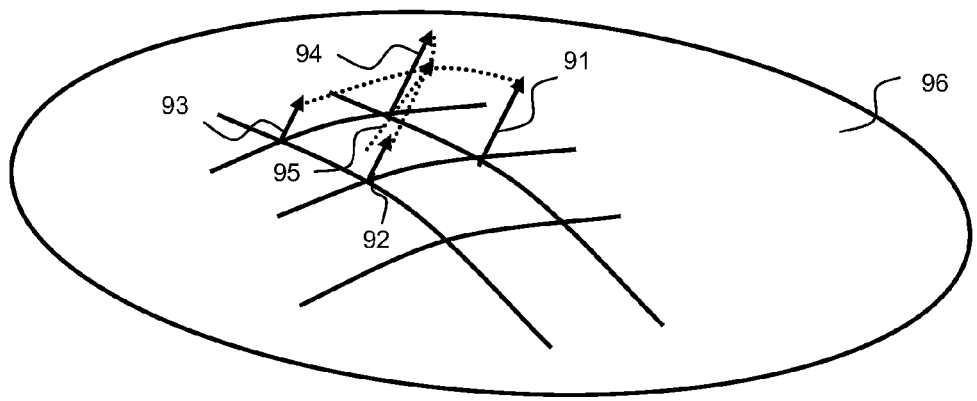
FIG. 2 shows a grid area of ionospheric corrections calculated by a calculating system of the ground segment.
Figure 3:
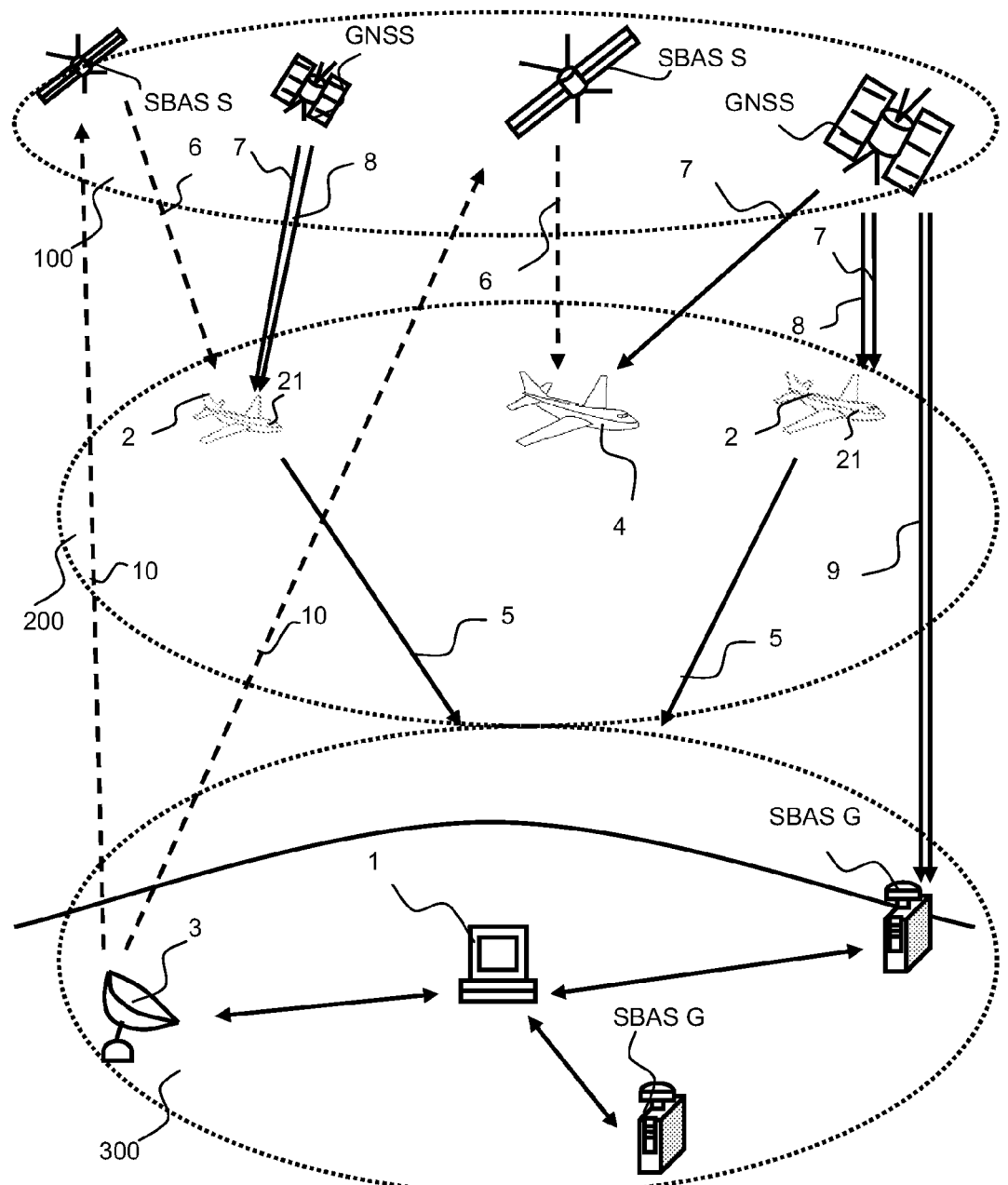
FIG. 3 shows a network according to the invention, making it possible to calculate and to provide ionospheric corrections to users, the architecture of which comprises a spatial segment and an aeronautical segment.

The invention described below, as shown in FIG. 3, relates to a network for calculating and transmitting ionospheric corrections for a satellite navigation system. It is clear that it applies to any GNSS satellite navigation system, such as for example the "GPS" system or the future "Galileo" system, using an SBAS augmentation system making it possible to provide correction data, such as for example the "EGNOS" system or the "WARS" system. An essential feature of the invention is to include in the architecture of the network for calculating ionospheric data an aeronautical segment 200 comprising a user segment constituted by aircraft 2 measuring ionospheric delays and communicating these measurements to the ground segment 300 with transmission means 5 designed with aeronautical requirements. These means of measurement 21 and transmission 5 provide increased reliability and service quality in comparison with a conventional solely satellite network and make it possible to obtain a number of measurements of ionospheric delays 91 to 94 higher than in a conventional network.

The spatial segment 100 is constituted by a plurality of GNSS satellites transmitting navigation signals 7 and 8 at distinct frequencies. For example, the Galileo GNSS system will be able to transmit on frequencies L1 (1563-1587 MHz), E5a (1164-1189 MHz) and E5b (1189-1214 MHz) for aeronautical users. The spatial segment 100 is also constituted by "SBAS S" satellites sending signals 6 transmitting location corrections data to aeronautical users, such as the aircraft 4 and 2, or non-aeronautical users such as, for example, motor vehicles or maritime vehicles. The measurement means 21 installed in the aircraft are radiofrequency (RF) receivers capable of receiving navigation signals 7 and 8 on distinct frequencies as mentioned above. These RF receivers 21 are capable, using the calculation method known to those skilled in the art, of measuring delays of navigation signals passing through the ionospheric layer at high altitudes, thus avoiding the local error contributions, as previously mentioned, and consequently providing more accurate measurements. The transmission means 5 use means, known to those skilled in the art in the aeronautical field, of high frequency communication between the aircraft 2 and the ground segment 300.

The ground segment comprises means, not shown in FIG. 3, of centralization and selection of ionospheric delays measurement sources used for calculating the grid of ionospheric corrections, the measurements of delays coming from the plurality of aircraft 2 and from the plurality of "SBAS G" ground stations. As the measurements coming from aircraft 2 can potentially be great in number, the calculating station 1 has a function for selecting the most relevant sources for the calculation of the ionospheric corrections grid. The calculating system 1 compiles measurements of delays 91 to 94 principally coming from a plurality of aircraft 2. The ground segment also comprises means of transmission 3 of data 10 of the grid of ionospheric corrections 96 to the spatial segment 100.

Advantageously, the method making it possible to calculate and to provide ionospheric corrections data 91 to 95 to the users of a satellite navigation system carries out the following steps:

measurement of delays 91 to 94 at the level of the aeronautical user segment and at the level of the ground segment SBAS G, transmission of the delays measured by the plurality of aircraft, the transmission of the data being carried out by an aeronautical communication network 5, to the ground segment 300, calculation of a grid of ionospheric corrections 96 by compiling data principally coming from the measurements carried out at the level of the aeronautical user segment 200, transmission to the spatial sector 100 of the data 91 to 95 of the grid of ionospheric corrections 96.

Advantageously, the measurements of delays at the level of the aeronautical user segment are carried out in real time and continuously during the flight phase of the aircraft 2. The invention makes it possible to sample the ionospheric layer in real time in various geographic areas and at different times during the day. In order to provide users with relevant ionospheric corrections, all of the steps of the method are carried out in real time and continuously.

Advantageously, the calculating system 1 of the ground segment 300 comprises means of selection of delay measurement sources in such a way that it uses the most relevant sources for the calculation of the grid of ionospheric corrections 96. In fact, the fleet of aircraft in flight can provide a number of measurements higher than that required.

Advantageously, when the number of delay measurements coming from the aeronautical user segment becomes less than a minimum threshold, for example in the unlikely case of a complete stoppage of the aeronautical network, the calculating system selects delay measurements coming from the ground stations. As a security measure, a minimum number of "SBAS G" ground stations are kept in service in order to guarantee a minimum number of delay measurements.

Advantageously, the aircraft 2 of the user segment 200 also comprise a means of receiving an indication of operational reliability of the RF receiver 21 and the calculating system 1 of the ground segment 300 comprises a means of assessing the reliability of the RF receivers 21 measuring delays and a means of transmission of an indication of reliability of said RF receivers 21 to the aircraft 2 of the user segment 200. In the calculation of the grid of ionospheric corrections 96, the ground station is capable of determining a value which is inconsistent with respect to the adjacent values. For example, if a high and isolated ionospheric delay value is detected in a geographic area exhibiting rather low values, it can be deduced that the measurement is false and that the RF receiver 21 of the aircraft in question probably has a malfunction. Advantageously, the calculating system 1 then transmits, to the plurality of aircraft having an on-board RF receiver capable of measuring delays, an indication of reliability of their RF receiver. The invention makes it possible to set up a cooperative system between the aeronautical user segment of the navigation system and the control organization of the satellite navigation system. In return for access to measurements of delays carried out on board aircraft, the control organization can provide an indication of reliability of the RF receiver on board the aircraft.

The invention claimed is:

1. A network making it possible to calculate and provide ionospheric corrections to the users of a satellite navigation system, comprising:

a spatial segment constituted by a plurality of satellites transmitting navigation signals at distinct frequencies and location corrections data to a user segment, a ground segment comprising a calculating system and means of transmission of data to the spatial segment in such a way that the calculating system compiles ionospheric delay measurements coming from a plurality of ground stations in order to calculate a grid of ionospheric corrections and that the transmission means transmit the grid of ionospheric corrections to the spatial segment, wherein the network also comprises:

an aeronautical segment comprising an aeronautical user segment composed of a plurality of aircraft each one having an on-board RF receiver capable of measuring delays of the navigation signals transmitted by the satellites and an aeronautical data communication means between the plurality of aircraft and the ground segment in order to transmit said measurements of delays to the ground segment, means, at the level of the ground segment, of receiving measurements of delays used for the calculation of the grid, the measurements of delays coming from the plurality of aircraft and from the plurality of ground stations.

2. The network as claimed in claim 1, wherein the calculating system of the ground segment comprises means of selecting the delays measurement sources in such a way that it uses most relevant measurement sources for the calculation of the ionospheric corrections grid.

3. The network as claimed in claim 2, wherein the aircraft of the user segment also comprise a means of receiving an indication of operational reliability of said RF receiver.

4. The network as claimed in claim 3, wherein the calculating system of the ground segment comprises a means assessing the reliability of the RF receivers measuring delays and a means of transmission of an indication of reliability of said RF receivers to the aircraft of the user segment.

5. A method making it possible to calculate and to provide ionospheric corrections data to the users of a satellite navigation system, wherein it uses a network as claimed in claim 4 in order to carry out the following steps:

measurement of delays at the level of the aeronautical user segment and at the level of the ground segment, transmission of the delays measured by the plurality of aircraft, the transmission of the data being carried out by an aeronautical communication network, to the ground segment, calculation of a grid of ionospheric corrections by compiling data principally coming from the measurements carried out at the level of the aeronautical user segment, transmission to the spatial sector of the data of the grid of ionospheric corrections.

6. The method as claimed in claim 5, wherein the steps are carried out in real time and continuously.

7. The method as claimed in claim 6, wherein, in order to calculate the grid of ionospheric corrections, when the number of delay measurements coming from the aeronautical user segment becomes less than a minimum threshold, the calculating system selects delay measurements coming from the ground stations.

8. The method as claimed in claim 7, wherein the calculating system transmits, to the plurality of aircraft having an on-board RF receiver capable of measuring delays, an indication of reliability of their RF receiver.

* * * * *